United States Patent
Yang et al.

(10) Patent No.: US 11,999,119 B2
(45) Date of Patent: Jun. 4, 2024

(54) METHOD FOR MANUFACTURING POLARIZING PLATE

(71) Applicant: LG CHEM, LTD., Seoul (KR)

(72) Inventors: Hyung Il Yang, Daejeon (KR); Dong Ho Ko, Daejeon (KR); Seong Jin Kim, Daejeon (KR); Chul In Joung, Daejeon (KR); Myeong Ho Lee, Daejeon (KR); Lee Won Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 558 days.

(21) Appl. No.: 17/053,020

(22) PCT Filed: Jun. 24, 2019

(86) PCT No.: PCT/KR2019/007577
§ 371 (c)(1),
(2) Date: Nov. 4, 2020

(87) PCT Pub. No.: WO2019/245351
PCT Pub. Date: Dec. 26, 2019

(65) Prior Publication Data
US 2021/0252813 A1    Aug. 19, 2021

(30) Foreign Application Priority Data

Jun. 22, 2018  (KR) .................. 10-2018-0071766

(51) Int. Cl.
*B29D 11/00* (2006.01)
*B32B 27/08* (2006.01)
(Continued)

(52) U.S. Cl.
CPC ........ *B29D 11/00644* (2013.01); *B32B 27/08* (2013.01); *B32B 37/12* (2013.01);
(Continued)

(58) Field of Classification Search
CPC ... B29D 11/00644; B32B 27/08; B32B 37/12; B32B 38/0012; B32B 2037/1253;
(Continued)

(56) References Cited

U.S. PATENT DOCUMENTS

| 8,197,708 B2 | 6/2012 | Cho et al. |
| 8,936,692 B2 | 1/2015 | Hirata et al. |

(Continued)

FOREIGN PATENT DOCUMENTS

| CN | 101501142 A | 8/2009 |
| CN | 102893202 A | 1/2013 |

(Continued)

OTHER PUBLICATIONS

WO2015068678A1 Machine Translation of Description (EPO/Google) (Year: 2022).*

(Continued)

*Primary Examiner* — Cynthia L Schaller
(74) *Attorney, Agent, or Firm* — Bryan Cave Leighton Paisner LLP

(57) ABSTRACT

The present disclosure relates to a method for manufacturing a polarizing plate. The method includes a step of preparing a transfer type retarder laminate which has a carrier substrate, an alignment film and a retarder layer sequentially; and a step of laminating the transfer type retarder laminate on one side of a polymeric stretched film containing a dichroic substance, where a peel force at a peeling angle of 90° between the carrier substrate and the retarder layer in the transfer type retarder laminate and a peeling rate of 300 mm/min is in a range of 0.10 N/20 mm to 0.13 N/20 mm.

(Continued)

(a)

(b)

(c)

(d)

The polarizing plate can be used as a circularly polarizing plate or an optical compensation polarizing plate in various display devices.

13 Claims, 7 Drawing Sheets

(51) Int. Cl.
*B32B 37/12* (2006.01)
*B32B 38/00* (2006.01)
*G02B 5/30* (2006.01)

(52) U.S. Cl.
CPC ........ *B32B 38/0012* (2013.01); *G02B 5/3016* (2013.01); *G02B 5/3033* (2013.01); *B32B 2037/1253* (2013.01); *B32B 2038/0028* (2013.01); *B32B 2307/42* (2013.01); *B32B 2457/20* (2013.01)

(58) Field of Classification Search
CPC ........ B32B 2038/0028; B32B 2307/42; B32B 2457/20; B32B 38/10; B32B 37/02; B32B 7/02; B32B 2037/0092; B32B 2038/0076; B32B 2307/402; B32B 2307/514; G02B 5/3016; G02B 5/3033; G02B 5/3083
See application file for complete search history.

(56) References Cited

U.S. PATENT DOCUMENTS

| | | | |
|---|---|---|---|
| 9,019,609 | B2 | 4/2015 | Hirata et al. |
| 10,054,726 | B2 | 8/2018 | Park et al. |
| 2007/0008459 | A1 | 1/2007 | Park et al. |
| 2018/0246381 | A1* | 8/2018 | Wakita .............. G02F 1/133711 |

FOREIGN PATENT DOCUMENTS

| | | | |
|---|---|---|---|
| JP | 2006-268006 A | | 10/2006 |
| JP | 2007114270 A | * | 5/2007 |
| JP | 2012-48045 A | | 3/2012 |
| KR | 10-2007-0007418 A | | 1/2007 |
| KR | 10-2008-0023131 A | | 3/2008 |
| KR | 10-2009-0013408 A | | 2/2009 |
| KR | 10-2011-0098689 A | | 9/2011 |
| KR | 10-2012-0050401 A | | 5/2012 |
| KR | 10-2013-0073954 A | | 7/2013 |
| KR | 10-2013-0112875 A | | 10/2013 |
| KR | 10-2014-0096605 A | | 8/2014 |
| KR | 10-2016-0028271 A | | 3/2016 |
| KR | 10-2016-0107585 A | | 9/2016 |
| TW | 201520612 A | | 6/2015 |
| WO | WO2015068678 A1 | * | 5/2015 |

OTHER PUBLICATIONS

JP2007114270A Machine Translation of Description (EPO/Google) (Year: 2022).*
Yue Wang; "The Effect of Peeling Rate and Peeling Angle on the Peeling Strength," U. Akron, May 2014, p. 22 (https://www.semanticscholar.org/paper/The-Effect-of-Peeling-Rate-and-Peeling-Angle-on-the-Wang/6e989898d2de4980ff7ff4c459e895a409dcd392) (Year: 2014).*
International Search Report from PCT/KR2019/007577, dated Sep. 25, 2019.
Written Opinion of the ISA from PCT/KR2019/007577, dated Sep. 25, 2019.

* cited by examiner

METHOD FOR MANUFACTURING POLARIZING PLATE

CROSS-REFERENCE TO RELATED APPLICATION

This application is a National Phase entry pursuant to 35 U.S.C. § 371 of International Application No. PCT/KR2019/007577 filed on Jun. 24, 2019, and claims the benefit of and priority to Korean Patent Application No. 10-2018-0071766, filed on Jun. 22, 2018, all of which are hereby incorporated by reference in their entirety for all purposes as if fully set forth herein.

TECHNICAL FIELD

The present application relates to a method for manufacturing a polarizing plate.

BACKGROUND ART

A polarizing plate including a retarder can be used in various display devices such as an LCD (liquid crystal display) and an OLED (organic light emitting display). A polarizing plate including transfer thin film retarders of 10 μm or less needs a process of laminating each retarder to a polarizer and transferring it. However, it is inevitable to increase the thickness by a transfer medium such as a pressure-sensitive adhesive agent upon the process of transferring the retarder of two or more layers (Prior Art Document: (Patent Document 1) Japanese Patent Application Publication No. 2012-048045).

DISCLOSURE

Technical Problem

The present application provides a method for manufacturing a thin polarizing plate having excellent optical performance.

Technical Solution

The present application relates to a method for manufacturing a polarizing plate. The method for manufacturing a polarizing plate of the present application may comprise steps of: preparing a transfer type retarder laminate including a carrier substrate, an alignment film and a retarder layer sequentially; and laminating the transfer type retarder laminate on one side of a polymeric stretched film containing a dichroic substance.

In this specification, the transfer of a retarder may mean a process of laminating a retarder layer formed on a carrier substrate to a body to be transferred, for example, a polarizer through an adhesive or the like, and then peeling and removing the carrier substrate.

After a stretching process and a lamination process of a polarizer, the method for manufacturing a polarizing plate of the present application can simplify the process by directly introducing the transfer type retarder into the lamination process in the existing polarizer stretching process instead of a process of separately laminating the transfer type retarder layer, thereby eliminating unnecessary layers other than the layers for optical performance, so that a very thin polarizing plate can be manufactured at the same performance.

However, the polarizer stretching process must have a constant stretching speed of a polymer film and thus, it is difficult to change the speed freely, and a long process path such as an oven UV tester must also be performed after the lamination process of the polarizer. A phenomenon may occur, in which the transfer type retarder layer is partially peeled off from the carrier substrate in the long process line, and in this case, it is difficult to take action because the process line cannot be stopped. In order to prevent such a problem, it is required that the retarder is well transferred to the body to be transferred, but is not peeled off from the carrier in other travelling situations.

When the peel force between the carrier substrate and the retarder layer is within a predetermined range, it is possible that the retarder layer is well transferred to the body to be transferred, but is not peeled off from the carrier in other travelling situations, whereby the inventors of the present application have confirmed that the actual implementation of the process of directly introducing the transfer type retarder thereto is possible in the existing process of laminating the polarizer and have completed the present invention.

According to the method for manufacturing a polarizing plate of the present application, the peel force between the carrier substrate and the retarder in the transfer type retarder laminate may be in a range of 0.10 N/20 mm to 0.13 N/20 mm. The peel force may be a peel force measured at a peeling angle of 90° and a peeling rate of 300 mm/min. When the peel force is less than 0.10 N/20 mm, there is a problem that the carrier substrate and the retarder layer are peeled off during the production process of the polarizing plate before peeling the carrier substrate, and when the peel force exceeds 0.13 N/20 mm, there is a problem that it is difficult to peel the carrier substrate after the lamination process.

As the carrier substrate, known materials can be used without any particular limitation. For example, an inorganic substrate such as a glass film, a crystalline or amorphous silicon film and a quartz or ITO (indium tin oxide) film, or a plastic substrate, and the like can be used. As the plastic substrate, a substrate including TAC (triacetyl cellulose); a COP (cycloolefin copolymer) such as a norbornene derivative; PMMA (poly(methyl methacrylate)); PC (polycarbonate); PE (polyethylene); PP (polypropylene); PVA (polyvinyl alcohol); DAC (diacetyl cellulose); PAC (polyacrylate); PES (poly ether sulfone); PEEK (polyetheretherketon); PPS (polyphenylsulfone), PEI (polyetherimide); PEN (polyethylenenaphthalate); PET (polyethyleneterephtalate); PI (polyimide); PSF (polysulfone); PAR (polyarylate) or an amorphous fluororesin, and the like can be used, without being limited thereto.

The alignment film may have a function of aligning a liquid crystal compound contained in the retarder layer, which is described below. The alignment film may be a photo-alignment film. The photo-alignment film can exhibit orientation characteristics by a non-contact method such as irradiation of linearly polarized light.

The alignment film may comprise a photo-orientational compound. In this specification, the term photo-orientational compound may mean a compound which is aligned (orientationally ordered) in a predetermined direction through light irradiation, and capable of orienting adjacent liquid crystal compounds or the like in a predetermined direction in the aligned state. The orientational compound may be a monomolecular compound, a monomeric compound, an oligomeric compound or a polymeric compound.

The photo-orientational compound may be a compound containing a photosensitive moiety. Various photo-orientational compounds which can be used for orientation of liquid crystal compounds are known. As the photo-orientational compound, for example, a compound aligned by trans-cis photoisomerization; a compound aligned by photo-destruction such as chain scission or photo-oxidation; a compound aligned by photopolymerization or photo-crosslinking such as [2+2] cycloaddition, [4+4] cycloaddition or photodimerization; a compound aligned by photo-Fries rearrangement or a compound aligned by ring opening/closure reaction, and the like can be used. The compound aligned by trans-cis photoisomerization can be exemplified by, for example, an azo compound such as a sulfonated diazo dye or an azo polymer, or a stilbene compound, and the like, and the compound aligned by photo-destruction can be exemplified by cyclobutane-1,2,3,4-tetracarboxylic dianhydride, aromatic polysilane or polyester, polystyrene or polyimide, and the like. In addition, the compound aligned by photo-crosslinking or photopolymerization can be exemplified by a cinnamate compound, a coumarin compound, a cinnamamide compound, a tetrahydrophthalimide compound, a maleimide compound, a benzophenone compound or a diphenylacetylene compound, or a compound having a chalconyl moiety (hereinafter, referred to as a chalcone compound) or a compound having an anthracenyl moiety (hereinafter referred to as an anthracenyl compound) as the photosensitive moiety, and the like, the compound aligned by photo-Fries rearrangement can be exemplified by an aromatic compound such as a benzoate compound, a benzamide compound and a methacrylamidoaryl methacrylate compound, and the compound aligned by ring-opening/closure reaction can be exemplified by a compound aligned by ring-opening/closure reaction of a $[4+2]\pi$ electronic system such as a spiropyran compound, and the like, without being limited thereto.

The photo-orientational compound may be a monomolecular compound, a monomeric compound, an oligomeric compound, a polymeric compound, or a blend of the photo-orientational compound and a polymer. Here, the oligomeric or polymeric compound may have a residue derived from the above-described photo-orientational compound or the above-described photo-sensitive moiety in the main chain or side chain.

The polymer having a residue derived from the photo-orientational compound or a photosensitive moiety or capable of being mixed with the photo-orientational compound can be exemplified by polynorbornene, polyolefin, polyarylate, polyacrylate, poly(meth)acrylate, poly(amic acid), polymaleinimide, polyacrylamide, polymethacrylamide, polyvinyl ether, polyvinyl ester, polystyrene, polysiloxane, polyacrylonitrile or polymethacrylonitrile, and the like, but is not limited thereto.

The polymeric compound that can be used as the photo-orientational compound can be typically exemplified by polynorbornene cinnamate, polynorbornene alkoxycinnamate, polynorbornene allyloxycinnamate, polynorbornene fluorinated cinnamate, polynorbornene chlorinated cinnamate or polynorbornene dicinnamate, and the like, but is not limited thereto.

When the orientational compound is a polymeric compound, the compound may have a number average molecular weight of, for example, about 10,000 g/mol to 500,000 g/mol or so, but is not limited thereto.

The alignment film can be formed by coating an alignment film composition comprising the photo-orientational compound on the carrier substrate or the retarder layer and then irradiating it with polarized ultraviolet rays. The alignment film composition may comprise a solvent, where a process of drying may further be included before irradiation with the ultraviolet rays after the coating.

The coating method of the alignment film composition can be performed by coating through a known coating method such as roll coating, a printing method, ink jet coating, a slit nozzle method, bar coating, comma coating, spin coating or gravure coating.

The alignment film composition may comprise a photoinitiator in addition to the photo-orientational compound. The photoinitiator can be used without particular limitation, for example, as long as it can induce a free radical reaction by light irradiation. Such a photoinitiator can be exemplified by an alpha-hydroxyketone compound, an alpha-aminoketone compound, a phenyl glyoxylate compound or an oxime ester compound, and the like, where for example, an oxime ester compound can be used. The ratio of the photoinitiator in the alignment film composition is not particularly limited, where it may be included to the extent that an appropriate reaction can be induced.

The method of adjusting the peel force between the carrier substrate and the retarder layer within the above range is not particularly limited, where a known method of adjusting the peel force can be applied. In one example, the peel force between the carrier substrate and the retarder layer can be adjusted by adjusting an irradiation dose of ultraviolet rays when the alignment film is formed on the carrier substrate. The ultraviolet irradiation dose may be, for example, in a range of 250 mJ/cm$^2$ to 1300 mJ/cm$^2$. The desired peel force can be obtained by appropriately controlling the ultraviolet irradiation dose within the above range depending on the kinds of the carrier substrate and the alignment film composition.

The retarder layer may be a cured layer of a liquid crystal composition. The liquid crystal composition may comprise a polymerizable liquid crystal compound. In this specification, the term "polymerizable liquid crystal compound" may mean a compound containing a moiety capable of exhibiting liquid crystallinity, such as a mesogen skeleton, and also containing one or more polymerizable functional groups. Such polymerizable liquid crystal compounds are variously known under the so-called RM (reactive mesogen). The polymerizable liquid crystal compound may be contained in the polymerized form in a cured layer, which may mean a state where the liquid crystal compound is polymerized to form skeletons of the liquid crystal polymer such as main chains or side chains in the cured layer.

The polymerizable functional group may be, for example, an alkenyl group, an epoxy group, a carboxyl group, an acryloyl group, a methacryloyl group, an acryloyloxy group or a methacryloyloxy group. The polymerizable liquid crystal compound may be a monofunctional or multifunctional polymerizable liquid crystal compound. Here, the monofunctional polymerizable liquid crystal compound may mean a liquid crystal compound having one polymerizable functional group, and the multifunctional polymerizable liquid crystal compound may mean a liquid crystal compound containing two or more polymerizable functional groups.

The retarder layer may comprise a polymerizable liquid crystal compound in a horizontally oriented, vertically oriented, spray-oriented or tilt-oriented state. The oriented state of the polymerizable liquid crystal compound can be appropriately selected depending on the optical properties of the desired retarder layer.

The retarder layer may be formed by forming an alignment film on a carrier substrate, and then coating a liquid crystal composition on the alignment film and curing it. In one example, the transfer type retarder laminate may comprise a retarder layer with a single-layer structure. In this case, the retarder layer can be formed by performing a process of forming an alignment film on a carrier substrate and then coating a liquid crystal composition on the alignment film and curing it once. In another example, the transfer type retarder laminate may comprise a retarder layer with a multilayer structure. In this case, the retarder layer can be formed by performing a process of forming an alignment film on a carrier substrate and then coating a liquid crystal composition on the alignment film and curing it twice or more. In one example, when the retarder has an n-layer structure, the retarder can be formed by performing a process of forming an alignment film on a carrier substrate and a process of coating and curing a liquid crystal composition n-times. In one example, when the retarder layer has a two-layer structure, the retarder layer can be formed by forming a first alignment film on a carrier substrate and then coating a first liquid crystal composition on the first alignment film and curing it to form a first retarder layer, and forming a second retardation layer on the first retarder layer and then coating a second liquid crystal composition on the second alignment film and curing it to form a second retarder layer.

The coating method of the liquid crystal composition can be performed by coating through a known coating method such as roll coating, a printing method, ink jet coating, a slit nozzle method, bar coating, comma coating, spin coating or gravure coating.

The curing method of the liquid crystal composition is not particularly limited, which can be performed by a known liquid crystal compound polymerization method. For example, it can be performed by a method of maintaining an appropriate temperature such that the polymerization reaction can be initiated or a method of being irradiated with suitable active energy rays. When the maintenance at an appropriate temperature and the irradiation of active energy rays are simultaneously required, the above processes can be performed sequentially or simultaneously. Here, the irradiation of active energy rays can be performed using, for example, a high-pressure mercury lamp, an electrodeless lamp or a xenon lamp, and the like, and the conditions of the irradiated active energy rays such as a wavelength, a light intensity or a light quantity can be selected within a range that the polymerization of the polymerizable liquid crystal compound can be properly performed.

According to the method for manufacturing a polarizing plate of the present application, in the step of preparing the transfer type retarder laminate, a pressure-sensitive adhesive or an adhesive may not be used at the time of forming the retarder layer. This makes it possible to produce very thin polarizing plates having the same performance by removing unnecessary layers other than the layers for optical performance.

The polarizing plate manufactured according to the method for manufacturing a polarizing plate of the present application does not include a pressure-sensitive adhesive or adhesive layer between the carrier substrate and the retarder layer or between multiple retarder layers when the retarder layer has a multilayer structure. Accordingly, the present application can solve the problem of the thickness increase by eliminating the adhesive or pressure-sensitive adhesive used for transferring the retarder layer having two or more layers. In addition, the use of the adhesive or pressure-sensitive adhesive layer upon the transferring process requires a process of laminating a retarder layer and a process of peeling a carrier substrate, whereby there is a problem that the number of processes increases as the number of retarder layers increases. In the present application, the polarizing plate having multiple retarder layers can be manufactured only by one transfer process, irrespective of the number of the retarder layers, so that the above problem can be solved.

In one example, the retarder layer may have a thickness of 0.2 μm to 10 μm. When the retarder layer has a multilayer structure, the respective retarder layers can independently satisfy the thickness range.

The optical properties of the retarder layer can be appropriately controlled according to the desired polarizing plate function. The polarizing plate may be used as a circularly polarizing plate or an optical compensation polarizing plate.

In one example, the retarder layer may be formed so as to satisfy any one refractive index relationship of the following equations 1 to 7. When the polarizing plate includes a multilayer retarder layer, the retarder layers may be formed so as to each independently satisfy any one refractive index relationship of the following equations 1 to 7.

$$nx>ny=nz(+A \text{ plate}) \quad [\text{Equation 1}]$$

$$nx=nz>ny(-A \text{ plate}) \quad [\text{Equation 2}]$$

$$nz>nx=ny(+C \text{ plate}) \quad [\text{Equation 3}]$$

$$nx=ny>nz(-C \text{ plate}) \quad [\text{Equation 4}]$$

$$nz>nx>ny(+B \text{ plate}) \quad [\text{Equation 5}]$$

$$nx>ny>nz(-B \text{ plate}) \quad [\text{Equation 6}]$$

$$nx>nz>ny(Z\text{-axis oriented film}) \quad [\text{Equation 7}]$$

In Equations 1 to 7, nx, ny and nz mean the refractive indexes of the retarder layer in the x-, y- and z-axis directions, respectively. In this specification, the x-axis direction may mean the slow axis direction, the y-axis direction may mean the fast axis direction, and the z-axis direction may mean the thickness direction. In this specification, the refractive index may mean a refractive index for light having a wavelength of about 550 nm, unless otherwise specified.

In one example, the retarder layers may be formed so as to each satisfy any one wavelength dispersion characteristic of the following equations 8 to 10. When the retarder layer has a multilayer structure, the respective retarder layers may be formed so as to independently satisfy any one wavelength dispersion characteristic of the following equations 8 to 10. Equation 8 below can be referred to as a reverse dispersion characteristic, Equation 9 can be referred to as a normal dispersion characteristic, and Equation 10 can be referred to as a flat dispersion characteristic.

$$R(450)/R(550)<R(650)/R(450) \quad [\text{Equation 8}]$$

$$R(450)/R(550)>R(650)/R(450) \quad [\text{Equation 9}]$$

$$R(450)/R(550)=R(650)/R(450) \quad [\text{Equation 10}]$$

In Equations 8 to 10, R (λ) may mean a retardation value of the retarder layer for light having a wavelength λ nm.

The retardation value may be a plane direction retardation (Rin) value calculated by the following equation 11 or a thickness direction retardation (Rth) value calculated by the following equation 12.

$$Rin=d\times(nx-ny) \quad [\text{Equation 11}]$$

$$Rth=d\times(nz-ny) \quad [\text{Equation 12}]$$

In Equations 11 and 12, nx, ny and nz are as defined above, and d is the thickness of the retarder layer.

The relationship between the optical axis of the retarder layer and the absorption axis of the polarizer can also be appropriately controlled in accordance with the desired polarizing plate function.

The polymeric stretched film containing the dichroic substance may be referred to as a polarizer. In this specification, the term polarizer means a film, sheet or element having a polarization function. The polarizer is a functional element capable of extracting light that vibrates in one direction from incident light that vibrates in various directions.

The polarizer may be an absorbing polarizer. In this specification, the absorbing polarizer means an element exhibiting selective transmission and absorption characteristics with respect to incident light. For example, the absorbing polarizer may transmit light that vibrates in one direction from incident light that vibrates in various directions, and absorb light that vibrates in the other directions.

The polarizer may be a linear polarizer. In this specification, the linear polarizer means a case where the selectively transmitting light is linearly polarized light that vibrates in any one direction, and the selectively absorbing light is linearly polarized light that vibrates in a direction orthogonal to the vibration direction of the linearly polarized light.

In one example, the dichroic substance may be iodine or a dichroic dye. The dichroic substance may be included in the polymeric stretched film in an oriented state. In one example, the dichroic substance may be present in a state oriented in the stretching direction of the polymeric stretched film.

The polymeric stretched film containing a dichroic substance may be formed by dyeing a dichroic substance on a polymer film and then stretching the polymer film. As the polymeric stretched film, a polyvinyl alcohol-based stretched film may be used. The transmittance and the polarization degree of the polarizer can be appropriately adjusted in consideration of the object of the present application. For example, the transmittance of the polarizer may be 42.5% to 55%, and the polarization degree may be 65% to 99.9997%.

In one example, the retarder layer may be laminated to the polymeric stretched film via an adhesive layer. The lamination of the retarder layer and the polymeric stretched film can be processed in a state where the adhesive is formed on one side of the retarder layer or in a state where it is formed on one side of the polarizer.

As the adhesive, for example, an ultraviolet curing adhesive may be used. As the ultraviolet curing adhesive, an acrylic adhesive, for example, a polyester acrylic, polystyrene acrylic, epoxy acrylic, polyurethane acrylic or polybutadiene acrylic, silicone acrylic or alkyl acrylic adhesive, and the like may be used, without being limited thereto.

In one example, after the lamination of the retarder layer and the polymeric stretched film, one side of the adhesive may be in contact with the polymeric stretched film and the other side may be in contact with the retarder layer. According to the method for manufacturing a polarizing plate of the present application, the retarder layer is directly laminated on one side of the polarizer, unlike the conventional method that the base films are laminated on both sides of the polarizer, respectively, in the process of manufacturing a polarizing plate. The polarizing plate manufactured according to the production method of the present application may have a structure that does not have a base film on one side of the polarizer. Therefore, the production method of the present application does not include unnecessary layers other than the layers for optical performance, so that a very thin polarizing plate having the same performance can be manufactured.

The method for manufacturing a polarizing plate of the present application may further comprise a step of laminating a surface-treated film on one side of the polymeric stretched film. The surface-treated film may be laminated on the opposite side of the polymeric stretched film on which the transfer type retarder laminate is laminated.

The lamination of the surface-treated film and the polymeric stretched film can be performed via an adhesive layer. The lamination of the surface-treated film and the polymeric stretched film can be processed in a state where an adhesive is formed on one side of the polarizer or in a state where it is formed on one side of the surface-treated film. As the adhesive layer, a known adhesive used for attaching the polarizer and the base film may be used. As the adhesive layer, for example, one or two or more of a polyvinyl alcohol-based adhesive; an acrylic adhesive; a vinyl acetate-based adhesive; a urethane-based adhesive; a polyester-based adhesive; a polyolefin-based adhesive; a polyvinyl alkyl ether-based adhesive; a rubber-based adhesive; a vinyl chloride-vinyl acetate-based adhesive; a styrene-butadiene-styrene (SBS) adhesive; a hydrogen additive-based adhesive of styrene-butadiene-styrene (SEBS); an ethylenic adhesive; and an acrylic ester-based adhesive, and the like can be included. Such an adhesive may be formed using, for example, an aqueous, solvent-based or solventless adhesive composition. In addition, the adhesive composition may be a thermosetting type, room temperature curing type, moisture curing type, active energy ray curing type or hybrid curing type adhesive composition.

In one example, after the lamination of the surface-treated film and the polymeric stretched film, one side of the adhesive may be in contact with the polymeric stretched film and the other side may be in contact with the surface-treated film.

According to the production method of the present application, the process of laminating the surface-treated film and the process of laminating the transfer type retarder laminate can be performed simultaneously. Therefore, the production method of the present application can simplify the production process of the polarizing plate.

In one example, a known surface-treated film may be used as the surface-treated film. The surface-treated film may comprise, for example, a base film and a surface-treated layer on the base film. The base film can be exemplified by TAC (triacetyl cellulose), COP (cycloolefin copolymer), acryl or PET (polyethyleneterephtalate), and the like. The surface-treated layer can be exemplified by an antireflection layer, a hard coating layer, and the like.

The method for manufacturing a polarizing plate of the present application may further comprise a step of removing the carrier substrate after laminating the transfer type retarder laminate on the polymeric stretched film. The removal of the carrier substrate can be performed by peeling the carrier substrate from the retarder layer. One side of the carrier substrate may not be subjected to a releasing treatment, and may be subjected to a releasing treatment, if necessary.

The method for manufacturing a polarizing plate of the present application may further comprise a step of forming a pressure-sensitive adhesive layer on one side of the alignment film from which the carrier substrate has been removed. The pressure-sensitive adhesive layer may be formed on one side of the alignment film via the adhesive layer or may be directly formed on one side of the alignment film. As the pressure-sensitive adhesive, a known pressure-sensitive adhesive such as an acrylic pressure-sensitive adhesive, a silicone-based pressure-sensitive adhesive, a rubber-based pressure-sensitive adhesive and a urethane pressure-sensitive adhesive can be used without particular limitation. The pressure-sensitive adhesive layer can be used for attaching a polarizing plate to a display device.

The polarizing plate manufactured according to the production method of the present application can be used as a circularly polarizing plate or an optical compensation polarizing plate. Such a polarizing plate can be used for various display devices. The display device is a device having a display element, which comprises a light emitting element or a light emitting device as a light emitting source. The display device may include a liquid crystal display device, an organic electroluminescence (EL) display device, an inorganic electroluminescence (EL) display device, a touch panel display device, an electron emission display device (an electric field emission display device (FED or the like), a surface electric field emission display device (SED)), an electronic paper (a display device using electronic ink or an electrophoresis element), a plasma display device, a projection display device (a grating light valve (GLV) display device, a display device with a digital micromirror device (DMD) or the like) and a piezoelectric ceramic display, and the like. The liquid crystal display device includes any of a transmissive liquid crystal display device, a transflective liquid crystal display device, a reflective liquid crystal display device, a direct-view type liquid crystal display device and a projection type liquid crystal display device, and the like. These display devices may be display devices for displaying two-dimensional images and stereoscopic display devices for displaying three-dimensional images. In particular, the circularly polarizing plate can be effectively used in organic EL display devices and inorganic EL display devices, and the optical compensation polarizing plate can be effectively used in liquid crystal display devices and touch panel display devices.

Advantageous Effects

The present application can provide a method for manufacturing a polarizing plate which has excellent optical performance and is very thin. Such a polarizing plate can be used as a circularly polarizing plate or an optical compensation polarizing plate in various display devices.

MODE FOR INVENTION

Hereinafter, the present application will be described in detail by way of examples according to the present application and comparative examples not complying with the present application, but the scope of the present application is not limited by the following examples.

Measurement Example 1. Measurement of Peel Force

The peel force between a carrier substrate and a retarder layer was measured with a TA50/900E Taxture Analyzer from Stable Micro Systems. Specifically, the peel force was measured while pulling the retarder layer from the carrier substrate at a peeling angle of 90° and a peeling rate of 300 mm/min (measurement temperature: 20° C.).

Example 1. Production of Polarizing Plate A

Figure 1:
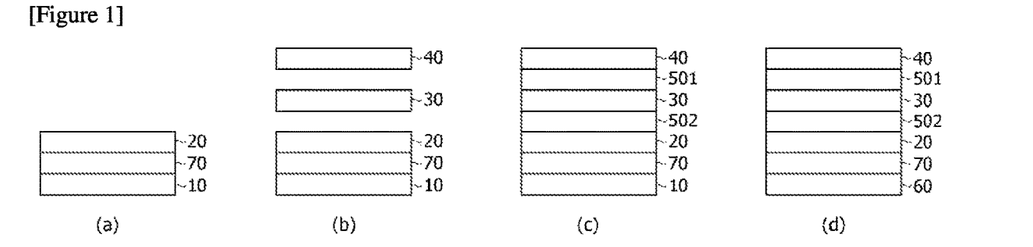
FIG. 1 exemplarily shows a production method of a polarizing plate in Example 1.

According to the production process of FIG. 1, a polarizing plate having a retarder layer with a single-layer structure was manufactured (alignment film (70)).

Specifically, an alignment film composition (polycinnamate-based alignment film) was coated on a carrier substrate (10) (PET film, thickness: 100 μm, area: 100 cm$^2$) by bar coating and dried, and then irradiated with ultraviolet rays in the UVB region to form an alignment film. The irradiation dose of the ultraviolet rays is 250 mJ/cm$^2$. A horizontal orientation liquid crystal composition was coated on the alignment film, irradiated with ultraviolet rays of 400 mJ/cm$^2$ and cured, thereby forming a +A plate having a thickness of 3 μm and a 214 characteristic as a retarder layer (20) ((a) in FIG. 1). The peel force between the carrier substrate and the retarder layer is 0.11 N/20 mm.

A PVA-based stretched film (30) with a thickness of 12 μm, in which iodine was dyed, was prepared as a polarizer. A film with a total thickness of 42 μm, in which a hard coat layer was coated on a TAC base film, was prepared as a surface-treated film (40) ((b) in FIG. 1).

A polarizing plate was manufactured by disposing a first adhesive (501) between one side of the polarizer (30) and the surface-treated film (40) and disposing a second adhesive (502) between the other side of the polarizer (30) and the retarder layer (20) to laminate them ((c) in FIG. 1). As each of the first adhesive and the second adhesive, a UV curing adhesive having a thickness of 1 μm was used.

The carrier substrate (10) was peeled off from the retarder layer (20) of the polarizing plate and a pressure-sensitive adhesive layer (60) (PSA) having a thickness of 13 μm was formed ((d) in FIG. 1). The total thickness of the polarizing plate in Example 1 was 72 μm.

Example 2. Production of Polarizing Plate B

Figure 2:
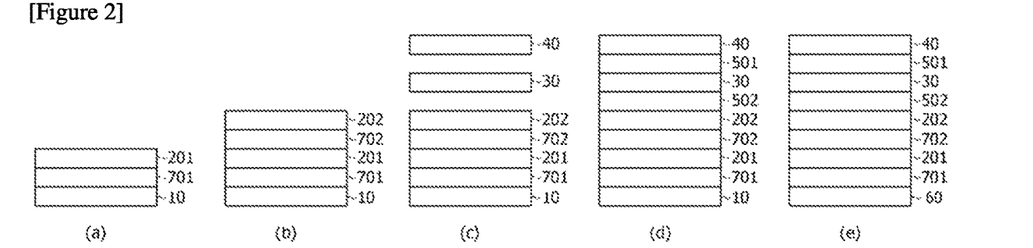
FIG. 2 exemplarily shows a production method of a polarizing plate in Example 2.

According to the production process of FIG. 2, a polarizing plate having a retarder layer with a multilayer structure was manufactured (first alignment film (701), second alignment film (702)).

Specifically, a first alignment film was formed on the carrier substrate (10) (PET film, thickness: 100 μm, area: 100 cm$^2$) in the same manner as in Example 1. A vertical orientation liquid crystal composition was coated on the first alignment film, irradiated with ultraviolet rays of 400 mJ/cm² and cured, thereby forming a +C plate having a thickness of 1 μm and a thickness direction retardation value of 60 nm as a first retarder layer (201) (a in FIG. 2).

A second alignment film was formed on the first retarder layer (201) in the same manner as in Example 1. A horizontal orientation liquid crystal composition was coated on the second alignment film, irradiated with ultraviolet rays of 400 mJ/cm² and cured, thereby forming a +A plate having a thickness of 3 μm and λ/4 characteristic as a second retarder layer (202).

A polarizer (30) and a surface-treated film (40) were prepared in the same manner as in Example 1 ((c) in FIG. 2).

A polarizing plate was manufactured by disposing a first adhesive (501) between one side of the polarizer (30) and the surface-treated film (40) and disposing a second adhesive (502) between the other side of the polarizer (30) and the second retarder layer (202) to laminate them ((d) in FIG. 2). As each of the first adhesive and the second adhesive, a UV curing adhesive having a thickness of 1 μm was used.

The carrier substrate (10) was peeled off from the first retarder layer (201) of the polarizing plate and a pressure-sensitive adhesive layer (60) (PSA) having a thickness of 13 μm was formed ((e) in FIG. 2). The total thickness of the polarizing plate in Example 2 was 73 μm.

Comparative Example 1. Production of Polarizing Plate C

Figure 3:
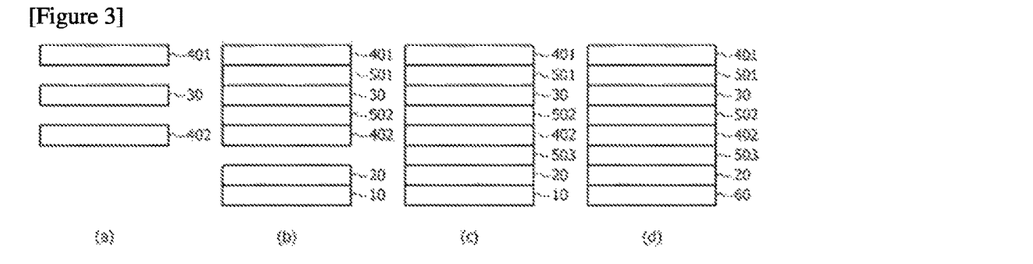
FIG. 3 exemplarily shows a production method of a polarizing plate in Comparative Example 1.

According to the production process of FIG. 3, a polarizing plate having a retarder layer with a single-layer structure was manufactured (an alignment film was not shown).

Specifically, a polarizer (30) and a surface-treated film (401) were prepared in the same manner as in Example 1, and a TAC film with a thickness of 40 μm was prepared as a base film (402) ((a) in FIG. 3).

A polarizing plate was manufactured by disposing a first adhesive (501) between one side of the polarizer (30) and the surface-treated film (401), disposing a second adhesive (502) between the other side of the polarizer (30) and the base film (402), and laminating them. As each of the first adhesive and the second adhesive, an aqueous adhesive having a thickness of 100 nm was used. An alignment film was formed on a carrier substrate (10) (PET film, thickness: 100 μm, area: 100 cm²) in the same manner as in Example 1. A horizontal orientation liquid crystal composition was coated on the alignment film, irradiated with ultraviolet rays of 400 mJ/cm² and cured, thereby forming a +A plate having a thickness of 3 μm and a 214 characteristic as a retarder layer (20) ((b) in FIG. 3).

The polarizing plate was manufactured by disposing a third adhesive (503) between the base film (402) and the retarder layer (20) and laminating them ((c) in FIG. 3). As the third adhesive, a UV curing adhesive having a thickness of 1 μm was used.

The carrier substrate (10) was peeled off from the retarder layer (20) of the polarizing plate and a pressure-sensitive adhesive layer (60) (PSA) having a thickness of 13 μm was formed ((d) in FIG. 3). The total thickness of the polarizing plate in Comparative Example 1 was 111 μm.

Comparative Example 2. Production of Polarizing Plate D

Figure 4:
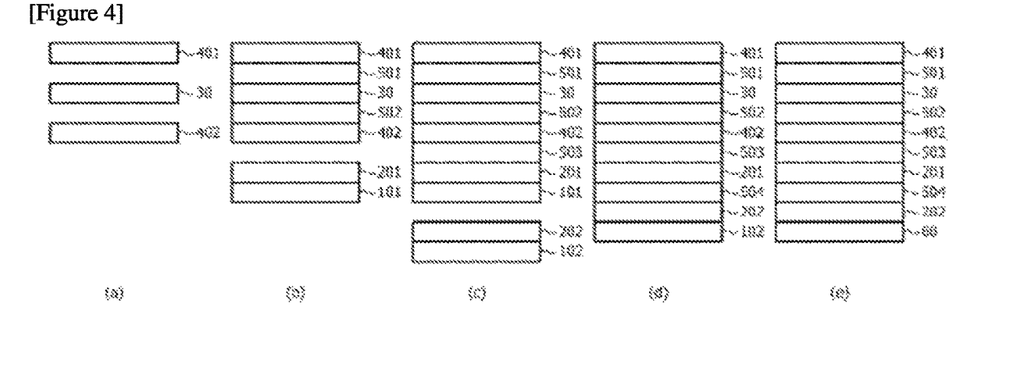
FIG. 4 exemplarily shows a production method of a polarizing plate in Comparative Example 2.

According to the production process of FIG. 4, a polarizing plate having a retarder layer with a multilayer structure was manufactured (an alignment film was not shown).

Specifically, a polarizer (30) and a surface-treated film (401) were prepared in the same manner as in Example 1, and a TAC film with a thickness of 40 μm was prepared as a base film (402) ((a) in FIG. 4).

A polarizing plate was manufactured by disposing a first adhesive (501) between one side of the polarizer (30) and the surface-treated film (401), disposing a second adhesive (502) between the other side of the polarizer (30) and the base film (402), and laminating them. As each of the first adhesive and the second adhesive, an aqueous adhesive having a thickness of 100 nm was used. A first alignment film was formed on a first carrier substrate (101) (PET film, thickness: 100 μm, area: 100 cm²) in the same manner as in Example 1. A horizontal orientation liquid crystal composition was coated on the first alignment film, irradiated with ultraviolet rays of 400 mJ/cm² and cured, thereby forming a +A plate having a thickness of 3 μm and a 214 characteristic as a first retarder layer (201) ((b) in FIG. 4).

The polarizing plate was manufactured by disposing a third adhesive (503) between the base film (402) and the first retarder layer (201), and laminating them. As the third adhesive, a UV curing adhesive having a thickness of 1 μm was used. A second alignment film was formed on a second carrier substrate (102) (PET film, thickness: 100 μm, area: 100 cm²) in the same manner as in Example 1. A vertical orientation liquid crystal composition was coated on the second alignment film, irradiated with ultraviolet rays of 400 mJ/cm² and cured, thereby forming a +C plate having a thickness of 1 μm and a thickness direction retardation value of 60 nm as a second retarder layer (202) ((c) in FIG. 4).

The first carrier substrate (101) was peeled off from the first retarder layer (201) of the polarizing plate and the second retarder layer was attached to the first retarder layer via a fourth adhesive layer (504) ((d) in FIG. 4). As the fourth adhesive, a UV curing adhesive having a thickness of 1 μm was used.

The second carrier substrate (102) was peeled off from the second retarder layer (202) of the polarizing plate and a pressure-sensitive adhesive layer (60) (PSA) having a thickness of 13 μm was formed ((e) in FIG. 4). The total thickness of the polarizing plate in Comparative Example 2 was 113 μm.

Evaluation Example 1. Optical Performance Evaluation

Figure 5:
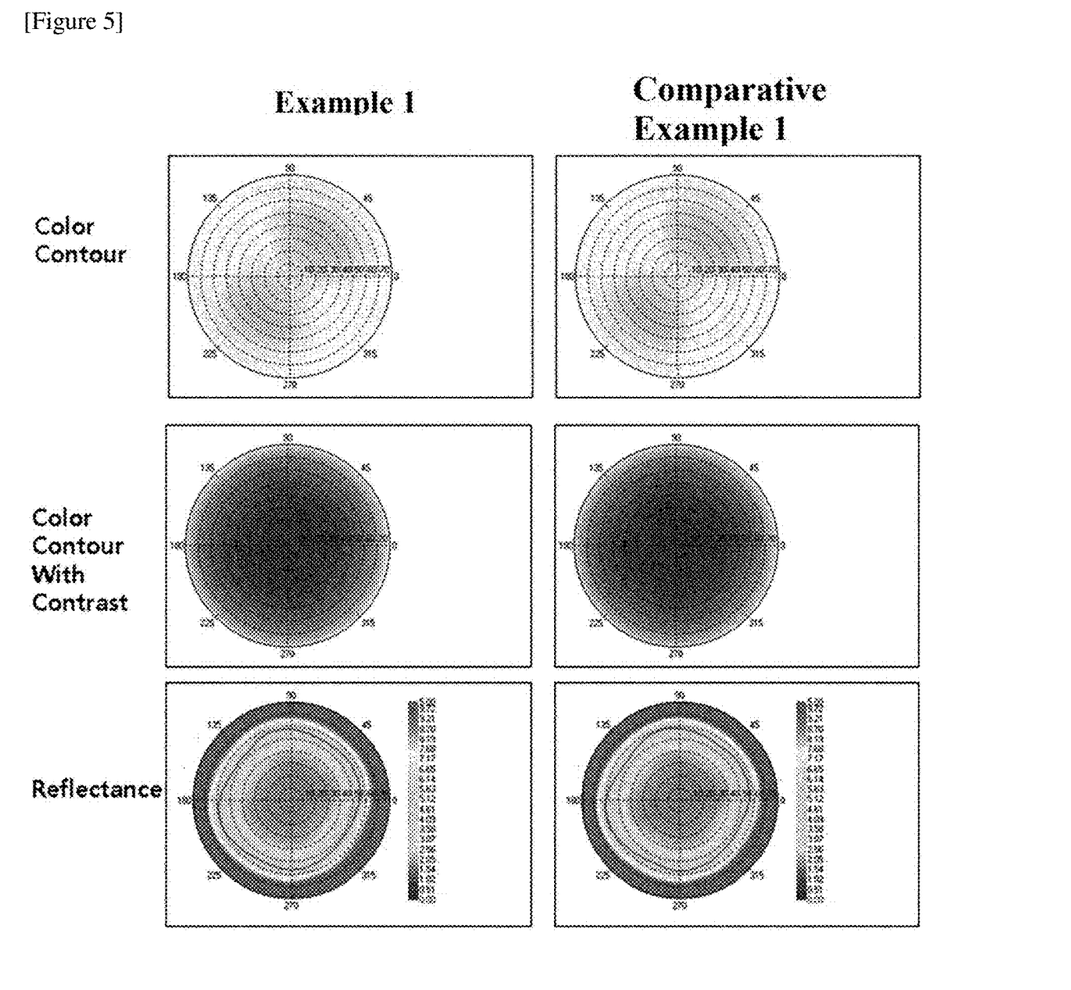
FIG. 5 is the optical characteristic evaluation results of Example 1 and Comparative Example 1.
Figure 6:
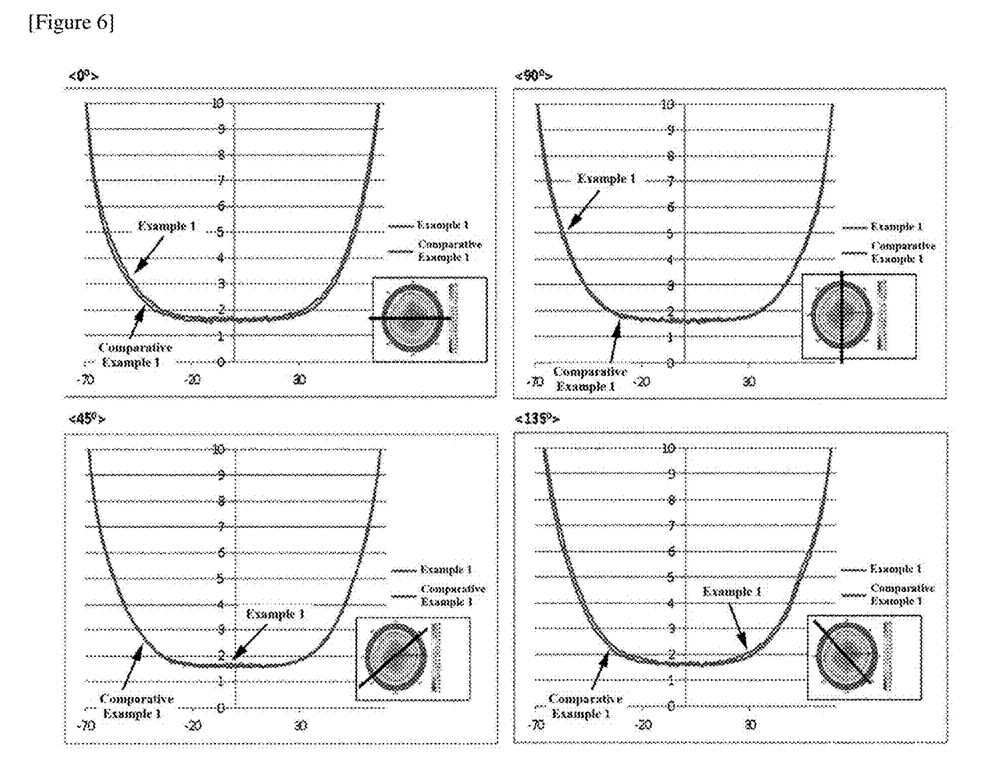
FIG. 6 is reflectance graphs according to viewing angles in Example 1 and Comparative Example 1.
Figure 7:
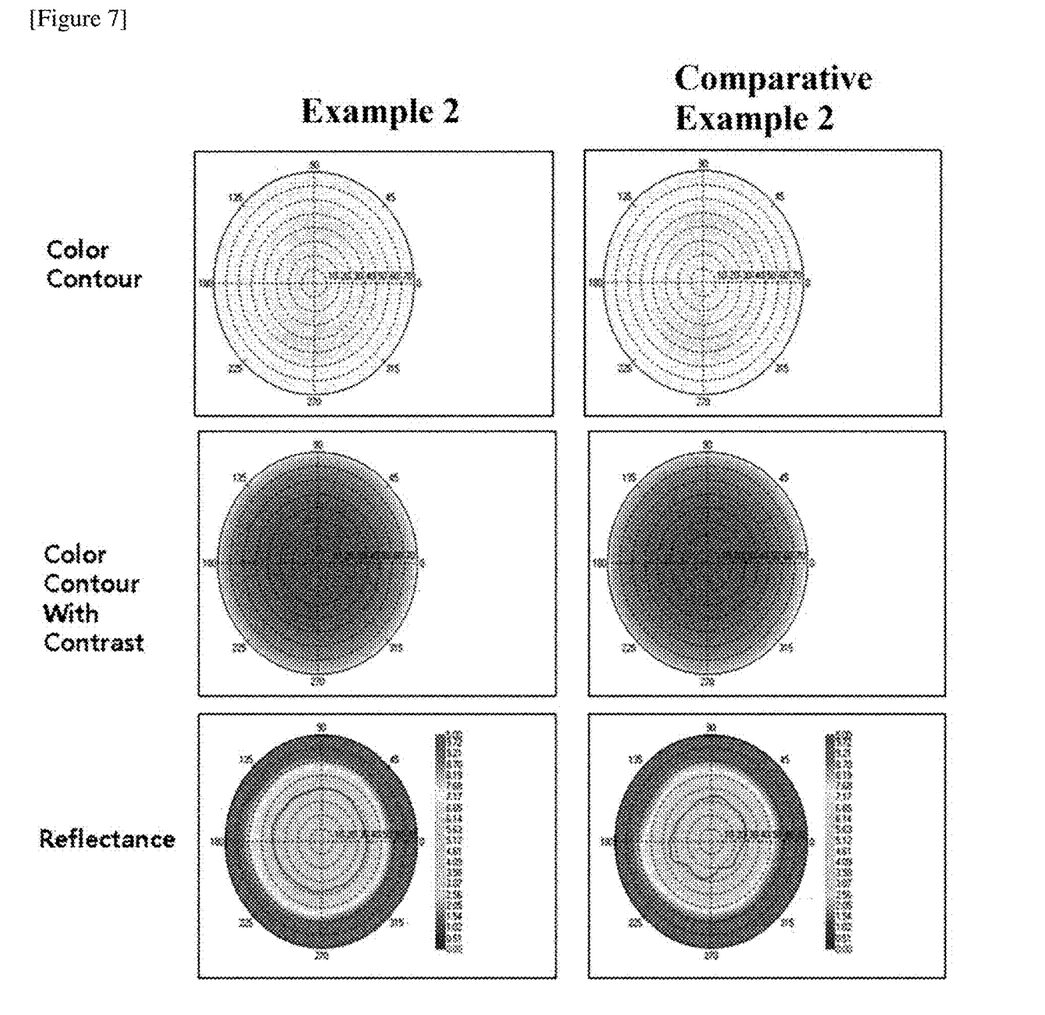
FIG. 7 is the optical characteristic evaluation results of Example 2 and Comparative Example 2.
Figure 8:
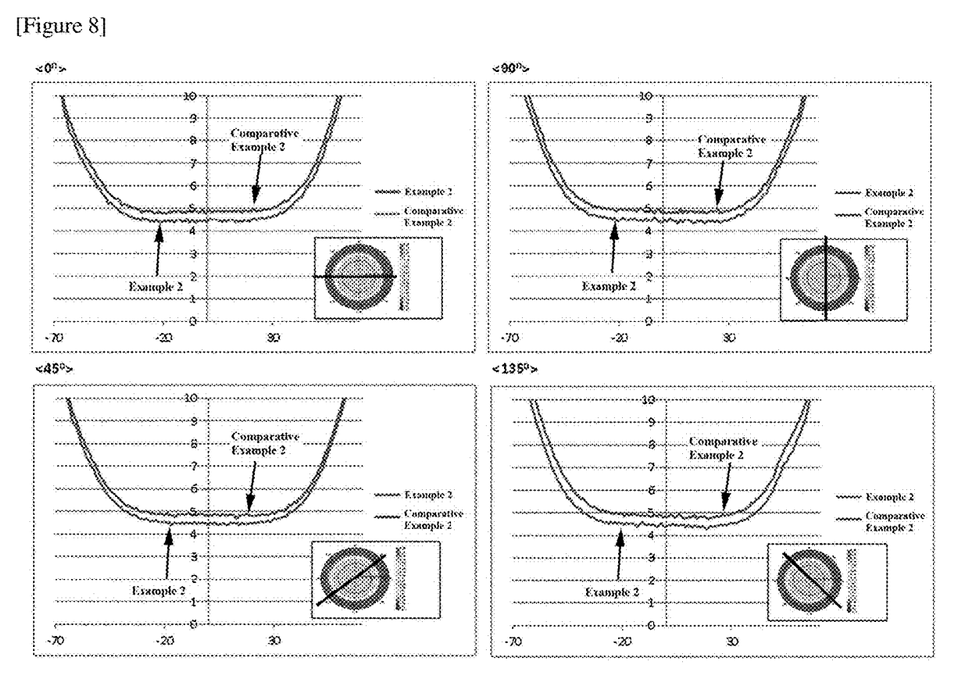
FIG. 8 is reflectance graphs according to viewing angles in Example 2 and Comparative Example 2.

The polarizing plates of Examples and Comparative Examples were each attached to an OLED TV panel (55" panel from LG Display) via a pressure-sensitive adhesive layer (60), and the reflectance of incident angles and azimuth angles was measured with EZ contrast from ELDIM. FIGS. 5 to 8 are evaluation result graphs. In FIGS. 5 and 7, each color contour means color at full azimuth angles and full incident angles, which means that the lighter the color, the better the viewing angle uniformity characteristic. The color contour with contrast means color and reflectance at full azimuth angles and full incident angles, which means that the darker the color, the better the reflectance characteristic. In FIGS. 6 and 8, <0°>, <45°>, <90°> and <135°>mean azimuth angles, respectively, the x-axis of the graph means incident angles)(°, and the y-axis of the graph means reflectance (%). The reflectance of the integrating sphere standard sample from ELDIM is taken as 100%. As a result of the evaluation, it can be confirmed that in Example 1 and Comparative Example 1, the visual appreciation and the reflectance are the same, and it can be confirmed that in Example 2 and Comparative Example 2, the visual appreciation and the reflectance are similar. In Example 2 and Comparative Example 2, the reflectance difference can be expressed by the retardation difference between the first retarder layer and the second retarder layer, and it can be confirmed that the reflectance for each viewing angle of Example 2 is lower than that of Comparative Example 2. This is because the second retarder layer of Example 2 is closer to the λ/4 characteristic than the second retarder layer of Comparative Example 2. If the retardation values are the same, it is also predicted that the reflectance will be the same.

Example 3. Production of Polarizing Plate E

A polarizing plate was manufactured in the same manner as in Example 1, except that the irradiation dose of ultraviolet rays was changed to 1300 mJ/cm² at the time of forming the alignment film. In Example 3, the peel force between the carrier substrate and the retarder layer is 0.13 N/20 mm.

Comparative Example 3. Production of Polarizing Plate F

A polarizing plate was manufactured in the same manner as in Example 1, except that a TAC film (thickness: 40 μm, area: 100 cm²) was used instead of the PET film as the carrier substrate and the irradiation dose of ultraviolet rays was changed to 1300 mJ/cm² at the time of forming the alignment film. The peel force between the carrier substrate and the retarder layer is 0.06 N/20 mm.

Comparative Example 4. Production of Polarizing Plate G

A polarizing plate was manufactured in the same manner as in Example 1, except that a TAC film (thickness: 40 μm, area: 100 cm²) was used instead of the PET film as the carrier substrate and the irradiation dose of ultraviolet rays was changed to 250 mJ/cm² at the time of forming the alignment film. The peel force between the carrier substrate and the retarder layer is 0.08 N/20 mm.

Evaluation Example 2. Production Processability Evaluation of Polarizing Plate

In the production methods of the polarizing plates of Examples and Comparative Examples, the processability was evaluated on the basis of the following criteria, and the results were shown in Table 1 below.

Figure 9:
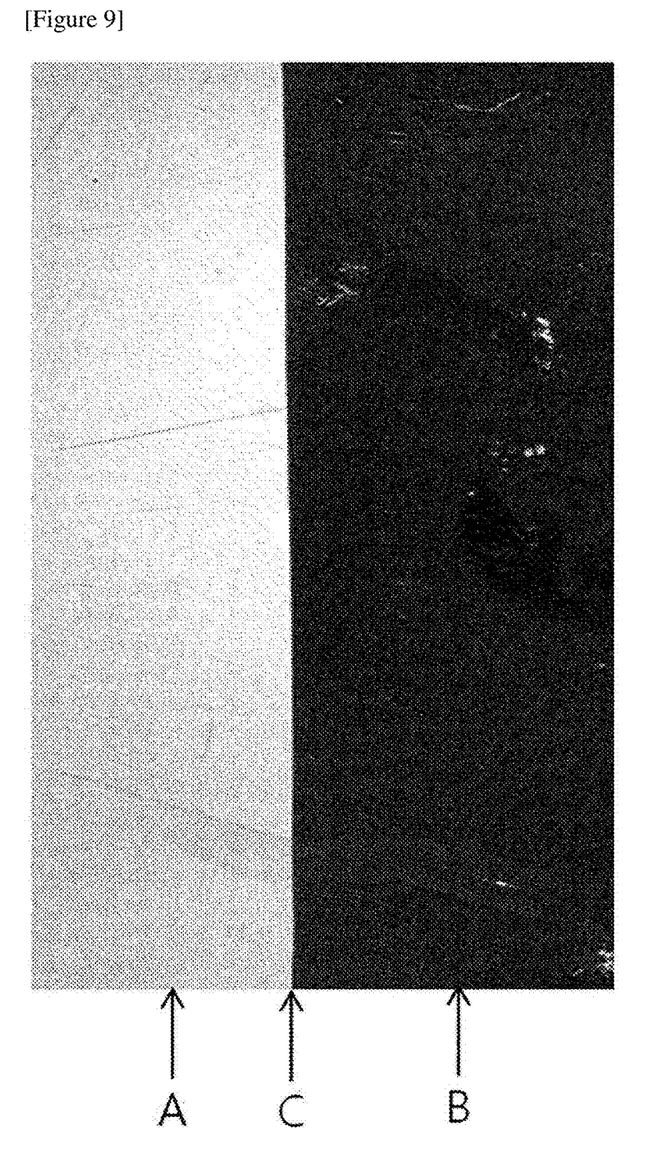
FIG. 9 is the production processability evaluation results of Example 1.

O: When the retarder layer was partially detached from the carrier substrate, a phenomenon, in which the boundary between the portion where the retarder layer was separated from the carrier substrate and the portion where the retarder layer remained was formed in a straight line, was determined to be the maximum adhesive force to the carrier substrate although the transfer was possible. FIG. 9 is an evaluation result image of Example 1 (A: non-transferred area, B: transferred area, C: boundary).

Figure 10:
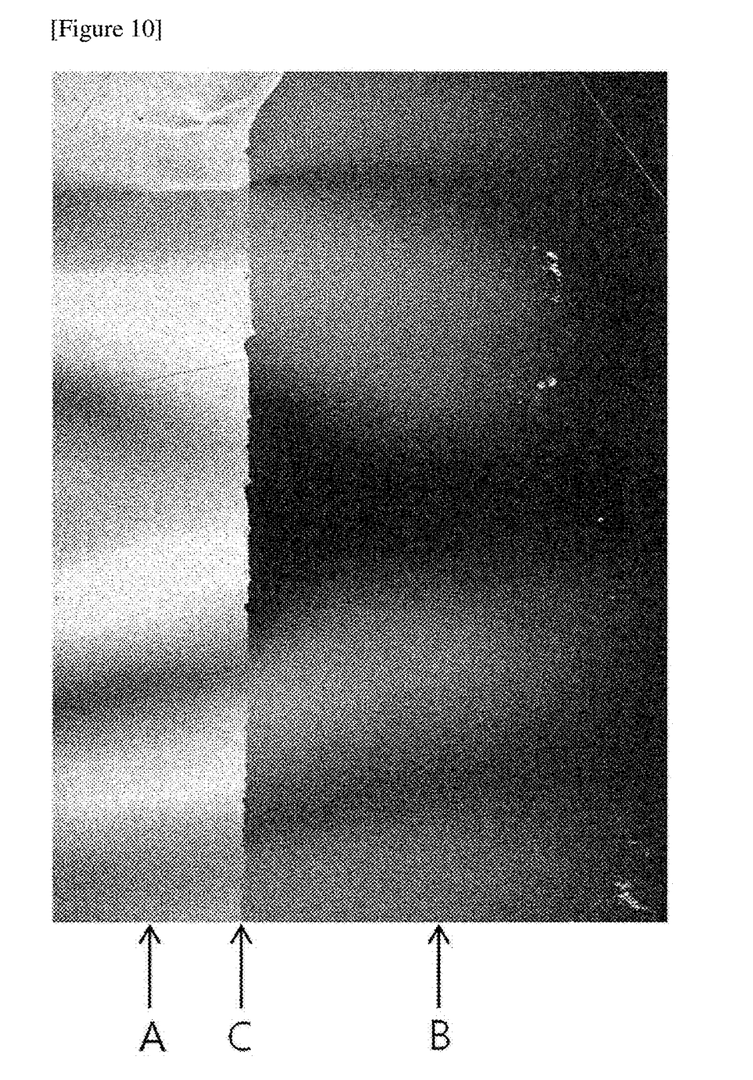
FIG. 10 is the production processability evaluation results of Comparative Example 3.

X: When the retarder layer was partially detached from the carrier substrate, a phenomenon, in which the boundary between the portion where the retarder layer was separated from the carrier substrate and the portion where the retarder layer remained was formed in a shape that was partially torn off, was determined to have a risk that some portions were released from the carrier substrate due to the weak adhesive force during the process (before lamination with the polymeric stretched film) or a risk of a lifting phenomenon between the retarder layer and the carrier substrate (after lamination with the polymeric stretched film), although the transfer was good. FIG. 10 is an evaluation result image of Comparative Example 3 (A: non-transferred area, B: transferred area, C: boundary).

TABLE 1

|  | Peel force (N/20 mm) | Processability evaluation results |
|---|---|---|
| Example 1 | 0.11 | O |
| Example 3 | 0.13 | O |
| Comparative Example 3 | 0.06 | X |
| Comparative Example 4 | 0.08 | X |

EXPLANATION OF REFERENCE NUMERALS 10, 101, 102: carrier substrate
20: retarder layer, 201: first retarder layer, 202: second retarder layer
30: polymeric stretched film
40, 401: surface-treated film, 402: base film
501, 502, 503, 504: first, second, third, fourth adhesive layer
60: pressure-sensitive adhesive layer

The invention claimed is:

1. A method for manufacturing a polarizing plate, comprising:
a step of preparing a transfer type retarder laminate including a carrier substrate, an alignment film formed on the carrier substrate and a retarder layer formed on the alignment film; and
a step of laminating the transfer type retarder laminate on one side of a polymeric stretched film containing a dichroic substance,
wherein the alignment film comprises a photo-orientational compound, and the alignment film is formed on the carrier substrate by irradiating ultraviolet rays to the photo-orientational compound in a range of 250 mJ/cm² to 1300 mJ/cm²,
wherein in the step of preparing the transfer type retarder laminate, no pressure-sensitive adhesive or other adhesive layer material is used during forming the retarder layer on the alignment film, and
wherein a peel force at a peeling angle of 90° between the carrier substrate and the alignment film in the transfer type retarder laminate and a peeling rate of 300 mm/min is in a range of 0.10 N/20 mm to 0.13 N/20 mm.

2. The method for manufacturing a polarizing plate according to claim 1, wherein the retarder layer has a single-layer structure, and the transfer type retarder laminate is formed by performing a process of forming the alignment film on the carrier substrate, and then coating a liquid crystal composition on the alignment film and curing the composition once to form the retarder layer.

3. The method for manufacturing a polarizing plate according to claim 1, wherein the retarder layer has a multilayer structure, and the transfer type retarder laminate is formed by performing a process of forming the alignment film on the carrier substrate, and then coating a liquid crystal composition on the alignment film and curing the composition two or more times to form the retarder layer.

4. The method for manufacturing a polarizing plate according to claim 1, wherein the dichroic substance comprises iodine or a dichroic dye.

5. The method for manufacturing a polarizing plate according to claim 1, wherein the polymeric stretched film is a polyvinyl alcohol-based stretched film.

6. The method for manufacturing a polarizing plate according to claim 1, wherein the dichroic substance exists in a state oriented in the stretching direction of the polymeric stretched film.

7. The method for manufacturing a polarizing plate according to claim 1, wherein the retarder layer is laminated on the polymeric stretched film via an adhesive layer.

8. The method for manufacturing a polarizing plate according to claim 7, wherein the adhesive layer is an ultraviolet curing adhesive layer.

9. The method for manufacturing a polarizing plate according to claim 1, further comprising a step of laminating a surface-treated film on the opposite side of the polymeric stretched film on which the transfer type retarder laminate is laminated.

10. The method for manufacturing a polarizing plate according to claim 9, wherein the lamination of the surface-treated film is performed simultaneously with the lamination of the transfer type retarder laminate and the polymeric stretched film.

11. The method for manufacturing a polarizing plate according to claim 10, wherein the surface-treated film comprises a base film and a surface-treated layer formed on the base film.

12. The method for manufacturing a polarizing plate according to claim 1, further comprising a step of laminating the transfer type retarder laminate to the polymeric stretched film and then removing the carrier substrate.

13. The method for manufacturing a polarizing plate according to claim 12, further comprising a step of forming a pressure-sensitive adhesive layer on one side of the alignment film from which the carrier substrate has been removed.

* * * * *